July 27, 1965   W. T. OLSON   3,196,598
INLET DEFLECTOR FOR JET ENGINES
Filed Oct. 31, 1962

INVENTOR
WALTER T. OLSON

BY
*[signatures]* ATTORNEYS

United States Patent Office 3,196,598
Patented July 27, 1965

3,196,598
INLET DEFLECTOR FOR JET ENGINES
Walter T. Olson, Fairview Park, Ohio, assignor to the United States of America as represented by the Administrator of the National Aeronautics and Space Administration
Filed Oct. 31, 1962, Ser. No. 234,568
2 Claims. (Cl. 55—306)
(Granted under Title 35, U.S. Code (1952), sec. 266)

The invention described herein may be manufactured and used by or for the Government of the United States of America for governmental purposes without the payment of any royalties thereon or therefor.

This invention is concerned with apparatus for obstructing the entry of birds and other foreign objects into aircraft jet engines during ground and flight operations. More particularly, the invention is concerned with deflecting debris away from the inlets to the engines.

The ingestion of foreign objects has proved to be a hazard to the operation of jet aircraft because as this debris enters the engine the inlet air stream is blocked to such an extent that a serious loss of power may result. Even temporary blockage or distortion of the inlet air can cause compressor blades to stall momentarily thereby causing a flame out. Likewise, these foreign objects entering the engines can block air passages in the combustor causing either permanent or temporary loss of power. This hazard is particularly great at take off where maximum uninterrupted power is needed and when flocks of birds are most likely to be encountered, especially at the ends of the runways.

Various guards and screening devices have been proposed for intercepting foreign objects in the inlet air stream to a jet engine. Many of these devices are located inside the lip of the engine nacelle or cowl, and such devices retain the intercepted foreign objects within the nacelle. Only when such a screen is retracted or moved to an open position are these foreign objects displaced from the air stream entering the engine. Some foreign objects, such as leaves or paper, catch on the screen and block or distort the air flow while ice on these screens likewise blocks or distorts this air flow.

The present invention contemplates the use of a deflector having a surface that is angularly disposed to the axis of the engine nacelle, and the base of the deflector surface is located ahead of the nacelle inlet. The projected area of this deflector is greater than the opening in the engine nacelle inlet while the tip of the deflector on the opposite side of the base from the nacelle inlet is directed forward. Consequently, the angularly disposed surface deflects the foreign objects out of the air stream as the objects approach the nacelle inlet, and an uninterrupted supply of air is assured to the engine at all times because the air stream can pass between the deflector base and nacelle inlet if a substantial portion of the deflector surface is momentarily covered with debris.

It is, therefore, an object of the present invention to provide an improved device for intercepting foreign objects at the inlet of a jet engine and deflecting these objects out of the air stream.

Another object of this invention is to provide a deflector for jet engines which assures an adequate air supply to the engine even if a substantial portion of the deflector is momentarily covered.

Other objects and advantages of the invention will be apparent from the specification which follows and from the drawings in which like numbers are used throughout to identify like parts.

Figure 1:
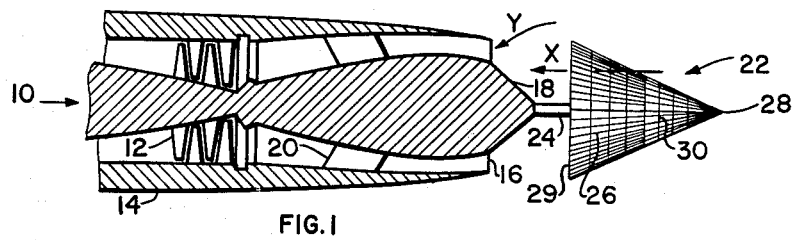
FIG. 1 is a sectional view of the forward portion of a conventional aircraft jet engine taken along the longitudinal axis thereof with a debris deflector mounted thereon that is constructed in accordance with the present invention and shown in elevation.

Referring now to the drawing, there is shown in FIG. 1 a conventional jet engine 10 for use in aircraft and the like having a plurality of blades 12 rotatably mounted therein. The construction of the engine 10 forms no part of the present invention; consequently, its structure will not be described in detail. A nacelle 14 encloses the engine 10 and forms an air inlet 16 at the forward end thereof while a center body 18 is mounted in the inlet 16 by a plurality of struts 20.

According to the present invention a deflector 22 is positioned ahead of the nacelle 14 to obstruct the entry of foreign objects into the inlet 16. The deflector 22 comprises a plurality of spaced members mounted on a center post 24 that is rigidly secured to the forward end of the center body 18, and the interstices between the spaced members is sufficiently large for adequate passage of air to the inlet 16 yet sufficiently small to intercept foreign objects of a size greater than can be safely ingested by the engine 10.

Referring now to FIG. 1, the deflector 22 includes a plurality of elongated rigid rods 26 arranged in the form of a cone extending rearwardly toward the engine 10 from a tip 28 of the center post 24. The rods 26 terminate in a plane generally normal to the axis of the engine 10 and ahead of the nacelle 14 to form a base 29 of the cone that is spaced from inlet 16 to enable the air stream to enter the engine 10 if a substantial portion of the deflector is momentarily covered with debris. More particularly, the inlet air stream for the engine 10 normally flows through the deflector 22 as shown by the arrow X. However, if a portion of the conical surface of the deflector 22 becomes momentarily covered with debris and a portion of the air stream is blocked, the air can flow around the base 29 of the deflector 22 into the inlet 16 as indicated by the arrow Y until the deflector surface becomes cleared.

The rods 26 are reinforced and maintained in their conical position by a plurality of circumferentially extending curved rods 30 and braces (not shown) which project radially outward from the center post 24. The rods 26 as well as the curved rods 30 can be of metal or plastic, and it is contemplated that coated materials may also be used for these members. The basic requirements for these members are that they be sufficiently strong to withstand the impact of the foreign objects and that they have a low coefficient of friction to prevent unnecessary retention of the foreign objects on the deflector 22.

Another important feature of the invention is that the conical surafce formed by the rods 26 and 30 be angularly disposed to the axis of the nacelle 14 along the center post 24 through a sufficient angle to insure the deflection of the foreign objects away from the inlet 16 out of the inlet air stream. This prevents the retention of debris on the forward surface of the deflector 22.

Figure 2:
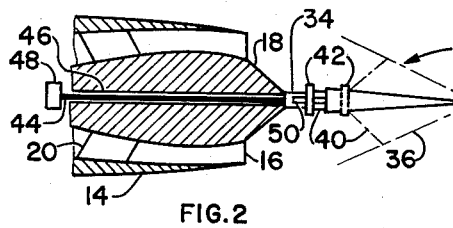
FIG. 2 is a sectional view of the air inlet of a conventional aircraft jet engine taken along the longitudinal axis thereof and having mounted thereon an alternate embodiment of the invention comprising a collapsible deflector shown both in the open and the folded positions.

In the alternate embodiments of the invention shown in FIGS. 2 through 7, the deflectors are foldable so as to make them less prone to interfere with the air stream during the high speed cruise portions of the aircraft flight. Referring to FIG. 2, there is shown a deflector 32 that differs in construction from the deflector 22 shown in FIG. 1 in that the deflector 32 which is supported by a tubular center post 34 does not utilize any circumferentially curved rods to reinforce its straight rods 36. The center post 34 is rigidly secured to the forward end of the center body 18, and the rods 36 are hingedly mounted at the forward tip 38 of the center post 34 while links 40 extending from a sleeve 42 form an umbrella support so that when the rods 36 are in the open position indicated by the dotted lines in FIG. 2, the deflector 32 is similar to the deflector 22 shown in FIG. 1 in that the rods 36 form a conical surface.

When the aircraft reaches its desired altitude the deflector is folded in umbrella fashion against the center post 34 as indicated by the solid lines in FIG. 2. This is accomplished by withdrawing an elongated bar 44 that extends through a bore 46 in the center body 18. One end of the bar 44 is connected to a suitable hydraulic or electrical actuating device 48 within the aircraft while the opposite end is operably connected to the sleeve 42 through a slot 50 in the center post 34.

Figure 3:
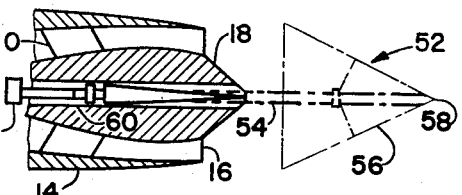
FIG. 3 is a sectional view of the air inlet of a conventional aircraft jet engine taken along the longitudinal axis thereof and having mounted thereon another embodiment of a collapsible deflector that is retractable within the inlet and which is shown both in the extended open position as well as the retracted folded position.

Referring now to FIG. 3, there is shown a deflector 52 that is similar in construction to the deflector 42 shown in FIG. 2 in that it is carried by a tubular center post 54 and comprises a plurality of elongated straight rods 56 hingedly mounted at the forward tip 58 of the center post 54 for movement in umbrella fashion from the open position to the closed position in the same manner as the deflector 32. In addition, the center post 54 is movably mounted in a longitudinally extending passage 60 in the center body 18, and when the aircraft reaches its desired altitude and cruising speed the deflector 52 is folded inwardly against the center post 54 in the same manner as the deflector 32 on FIG. 2 is collapsed. Thereupon, the center post 54 and the folded deflector 52 are retracted within the passage 60 as indicated by the solid lines in FIG. 3 by a suitable hydraulic or electrical mechanism 61.

Figure 4:
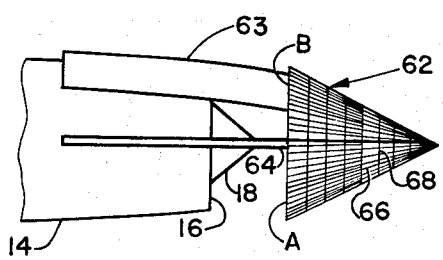
FIG. 4 is an elevation view of the air inlet portion of a conventional aircraft jet engine having mounted thereon still another embodiment of a deflector constructed in accordance with the present invention.
Figure 5:
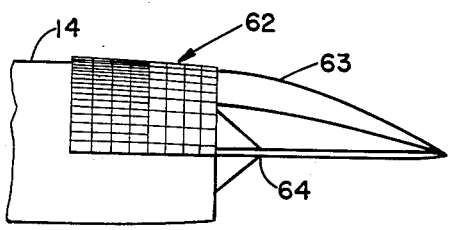
FIG. 5 is an elevation view of the inlet portion of the engine illustrated in FIG. 4 showing the deflector in the retracted position.

In the embodiment shown in FIGS. 4 and 5, a deflector 62 is slidably mounted on forwardly extending supports 63 and 64 mounted on the front end of the engine nacelle 14. The support 63 is positioned at the top of the inlet 16 while a pair of opposed supports 64 extend from the sides of the nacelle 14. The deflector 62 is similar to the deflector 22 of FIG. 1 in that it utilizes both straight rods 66 and curved rods 68; however, the curved rods 68 are expandable.

The rods 66 and 68 are arranged in two half-cones identified as A and B in FIGS. 4 and 5, and when the aircraft reaches the desired altitude and cruising speed the lower half-cone A is rotated upwardly by a suitable mechanism integral with the supports 63 and 64 to its mating position wherein it is in substantial juxtaposition with the upper half-cone B. The two mated half-cones are then moved rearwardly on the supports 63 and 64 by the aforementioned intgrated mechanism where they are positioned immediately above the upper portion of the nacelle 14. It will be appreciated that the upper half-cone could be rotated downwardly and the two mated half-cones could be positioned below the nacelle 14. Likewise, these mated half-cones could be positioned inside the skin of the nacelle at the engine inlet 16.

Figure 6:
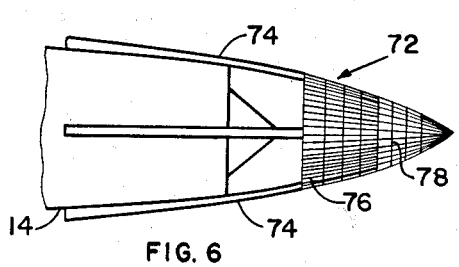
FIG. 6 is an elevation view of the inlet portion of a conventional aircraft jet engine having mounted thereon still another embodiment of a deflector constructed in accordance with the present invention.
Figure 7:
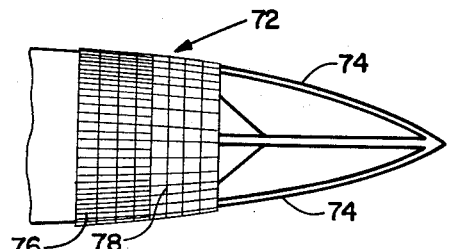
FIG. 7 is an elevation view of the air inlet portion of the engine illustrated in FIG. 6 showing the deflector in a retracted position.

In the alternate embodiment shown in FIGS. 6 and 7, a deflector 72 is supported by a plurality of forwardly extending curved struts 74 that are mounted on the outer surface of the engine nacelle 14. The deflector 72 comprises a plurality of elongated rods 76 that are suitably supported on the struts 74 and the rods 76 are connected by circumferentially extending expandable curved members 78 that are similar to the members 68 shown in FIGS. 4 and 5. As the aircraft reaches its desired altitude and cruising speed, the deflector 72 is moved from its extended position shown in FIG. 6 to the retracted position shown in FIG. 7 by sliding the members 76 and 78 along struts 74 with a suitable mechanism integral with these struts.

Although several embodiments of the present invention have been disclosed and described, it will be apparent that various modifications may be made to the disclosed structure without departing from the spirit of the invention or from the scope of the subjoined claims. For example, the shape of the deflectors may be ogival instead of conical.

What is claimed is:

1. In an aircraft jet engine of the type having a nacelle forming an air inlet at the forward end thereof and a center body rigidly mounted on the nacelle in the air inlet, the improvement comprising
    a center post rigidly mounted on the forward end of the center body and extending outward from the air inlet, and
    deflector means mounted on said center post ahead of the nacelle for obstructing the entry of foreign objects into the air inlet, said deflector means comprising
    a plurality of spaced rods arranged in the form of a cone whereby said foreign objects are deflected from the air inlet, each of said rods having a forwardly directed end mounted on the center post and a rearwardly directed end located forwardly from the inlet at the base of the cone so that the spacing between the inlet and the base of the cone forms a substantially unobstructed air passage thereby enabling air to flow between the outer periphery of the nacelle and the base of the cone when a portion of the deflector means is momentarily covered by said foreign objects.

2. In an aircraft jet engine of the type having a nacelle forming an air inlet at the forward end thereof and a center body mounted therein, the improvement comprising
    an elongated member carried by the center body and extending forward from the air inlet, and
    deflector means mounted on said elongated member ahead of the nacelle for obstructing the entry of foreign objects into the air inlet, said deflector means comprising a plurality of spaced elongated elements arranged to define a conical structure coaxial with said nacelle and having its vertex forwardly directed and mounted on the forwardly extending portion of said member and its base spaced forwardly from said nacelle air inlet so as to define an annular space therebetween, said annular space forming a substantially unobstructed air passage thereby enabling air to flow between the outer periphery of the nacelle and said base when a portion of said deflector means is momentarily covered by said foreign objects.

References Cited by the Examiner

UNITED STATES PATENTS

| | | | |
|---|---|---|---|
| 2,534,138 | 12/50 | Marshall | 55—306 |
| 2,546,153 | 3/51 | De Remer | 55—306 |
| 2,623,610 | 12/52 | Buechel | 55—306 |
| 2,928,497 | 3/60 | Stockdale | 55—306 |
| 2,944,631 | 7/60 | Kerry et al. | 55—306 |
| 3,121,545 | 2/64 | Meletiou | 60—39.09 |

HARRY B. THORNTON, *Primary Examiner.*